(12) United States Patent  (10) Patent No.: US 8,499,490 B2
Whitten  (45) Date of Patent: Aug. 6, 2013

(54) RETICULATED FOAM FOR USE IN HORTICULTURAL APPLICATIONS

(76) Inventor: Kris Whitten, Huntington Beach, CA (US)

( * ) Notice: Subject to any disclaimer, the term of this patent is extended or adjusted under 35 U.S.C. 154(b) by 154 days.

(21) Appl. No.: 13/047,679

(22) Filed: Mar. 14, 2011

(65) Prior Publication Data

US 2012/0233919 A1 Sep. 20, 2012

(51) Int. Cl.
*A01G 9/00* (2006.01)

(52) U.S. Cl.
USPC .............................. 47/17; 210/510.1; 210/767

(58) Field of Classification Search
USPC .................. 47/17, 59 S, 59 R, 60, 61, 63, 64, 47/1.01 R; 210/496, 500.1, 510.1, 767
See application file for complete search history.

(56) References Cited

U.S. PATENT DOCUMENTS

| | | | | |
|---|---|---|---|---|
| 3,031,827 A | * | 5/1962 | Frohmader et al. | 55/526 |
| 3,171,820 A | * | 3/1965 | Volz | 521/61 |
| 3,476,933 A | * | 11/1969 | Mendelsohn | 521/61 |
| 4,292,760 A | * | 10/1981 | Krave | 47/14 |
| 4,350,507 A | * | 9/1982 | Greenough et al. | 73/863.23 |
| 4,704,143 A | * | 11/1987 | Percy | 96/421 |
| 5,891,207 A | * | 4/1999 | Katta | 55/385.3 |
| 6,086,755 A | * | 7/2000 | Tepper | 210/150 |
| 8,186,100 B2 | * | 5/2012 | Chuang et al. | 47/17 |
| 2013/0104452 A1 | * | 5/2013 | Hassle | 47/17 |

* cited by examiner

*Primary Examiner* — Rob Swiatek
*Assistant Examiner* — Ebony Evans
(74) *Attorney, Agent, or Firm* — John D. Tran; Rhema Law Group, P.C.

(57) ABSTRACT

An air filtration apparatus for use in horticultural applications provides, in the exemplary embodiment, a coupling portion configured for engagement about an un-filtered air source in fluid communication with an enclosed plant growing area. The coupling portion defines an opening extending therethrough. A support portion is integral about a free end of the coupling portion. A reticulated foam piece is coupled to, and configured for covering, an opposing end of the support portion. The opposing end of the support portion has a diameter relatively larger than that of the coupling portion. Thus, with the coupling portion engaged about the un-filtered air source, the apparatus is capable of removing or trapping impurities—such as dust, dirt, pollen, mold spores, insects, pests, etc.—as the un-filtered air travels into the opening of the coupling portion and through the reticulated foam piece, thereby keeping said impurities out of the associated plant growing area.

11 Claims, 5 Drawing Sheets

RETICULATED FOAM FOR USE IN HORTICULTURAL APPLICATIONS

FIELD OF THE INVENTION

This invention is in the field of horticulture filtration, in particular, reticulated foam used in various horticultural applications.

BACKGROUND OF THE INVENTION

Horticulture is the industry and science of plan cultivation including the process of preparing soil for the planting of seeds. Horticulture primarily differs from agriculture in two ways: firstly it generally encompasses a smaller scale of cultivation, using small plots of mixed crops rather than large fields of single crops. Secondly horticultural cultivations generally include a wide variety of crops, even including fruit trees with ground crops. Within the field, horticulturists work to improve crop yield, quality, nutritional value and resistance to insects, diseases and environmental stresses. On a smaller scale, horticulture also typically refers to gardening and the caretaking of plants, shrubs, herbs and various landscaping matters. Horticulturists routinely are seeking ways to improve on the ability to remove certain factors that cause loss attributed to plant damage. One way is to attempt to control the environment in which to cultivate plants by having indoor gardens and/or grow rooms. As one can understand, the ability to remove or filter out harmful impurities from the indoor garden air is important to keep plants healthy. In doing so, horticulturists have relied on using a variety of types of filters made of paper or other material in attempt to filter out the incoming air into the indoor garden.

While these devices may be suitable for the particular purpose to which they address, they are not suitable for incorporating the advantages of reticulated foam for horticulture specific applications which comprises an apparatus containing reticulated foam, which can be modified and customized to fit a variety of connections for areas of air exchange or when filtration is necessary.

In these respects, the reticulated foam for use in horticultural applications according to the present invention substantially departs from the conventional concepts and designs of the prior art, and in so doing provides a storage system that is not anticipated, rendered obvious, suggested, or even implied by any of the prior art reticulated foam for use in horticultural applications either alone or in combination thereof.

SUMMARY OF THE INVENTION

The reticulated foam for use in horticultural applications according to the present invention is used to construct a filter to keep dust, dirt, pollen, mold spores, insects, pests, etc. out of enclosed plant growing areas i.e. (greenhouses, residential and commercial plant propagation areas) and enclosed growing areas where air exchange or filtration is necessary. The horticultural industry also utilizes air cooled lamp reflectors to combat heat build-up. The air that is drawn through the reflectors and/or enclosed growing area is usually contaminated with previously mentioned foreign objects. This leads to less reflectivity of the light source due to dust build up on the reflective surfaces, glass lenses, light bulbs and potential for foreign objects or debris to damage the light source (bulb).

The reticulated foam for use in horticultural applications in the present invention can also be made into a sock or sleeve that slips over/around an activated charcoal or activated carbon filter to keep debris out of the carbon/charcoal bed. This eliminates clogging of the carbon/charcoal bed with debris, prolonging the active life of the filter while still keeping impurities from entering the air cooled reflectors/enclosed growing space.

In view of the foregoing disadvantages inherent in the known types of horticultural filtration devices now present in the prior art, the general purpose of the present invention, which will be described subsequently in greater detail, is to provide reticulated foam for horticultural applications comprising of a one-piece construction.

Another object of the present invention is to provide reticulated foam for use in horticultural applications that can be modified and customized to fit areas where filtration is desired.

Another object of the present invention is to provide a one-piece reticulated foam for use in horticultural applications that is relatively easy and inexpensive to manufacture;

Another object of the present invention is to provide reticulated foam for use in horticultural applications that can be modified and situated to accommodate various types of indoor garden rooms or growth rooms.

Another object of the present invention is to provide reticulated foam for use in horticultural applications that contains a coupling mechanism that minimizes or negates the need of moving parts.

To attain this, the present invention generally comprises a reticulated foam portion, a base portion, and a coupling means for coupling said reticulated foam and base portion to a variety of locations in which air filtration is desired.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting. To accomplishment of the above and related objects, this invention may be embodied in the form illustrated in the accompanying drawings, attention being called to the fact, however, that the drawings are illustrative only, and that changes may be made in the specific construction illustrated.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
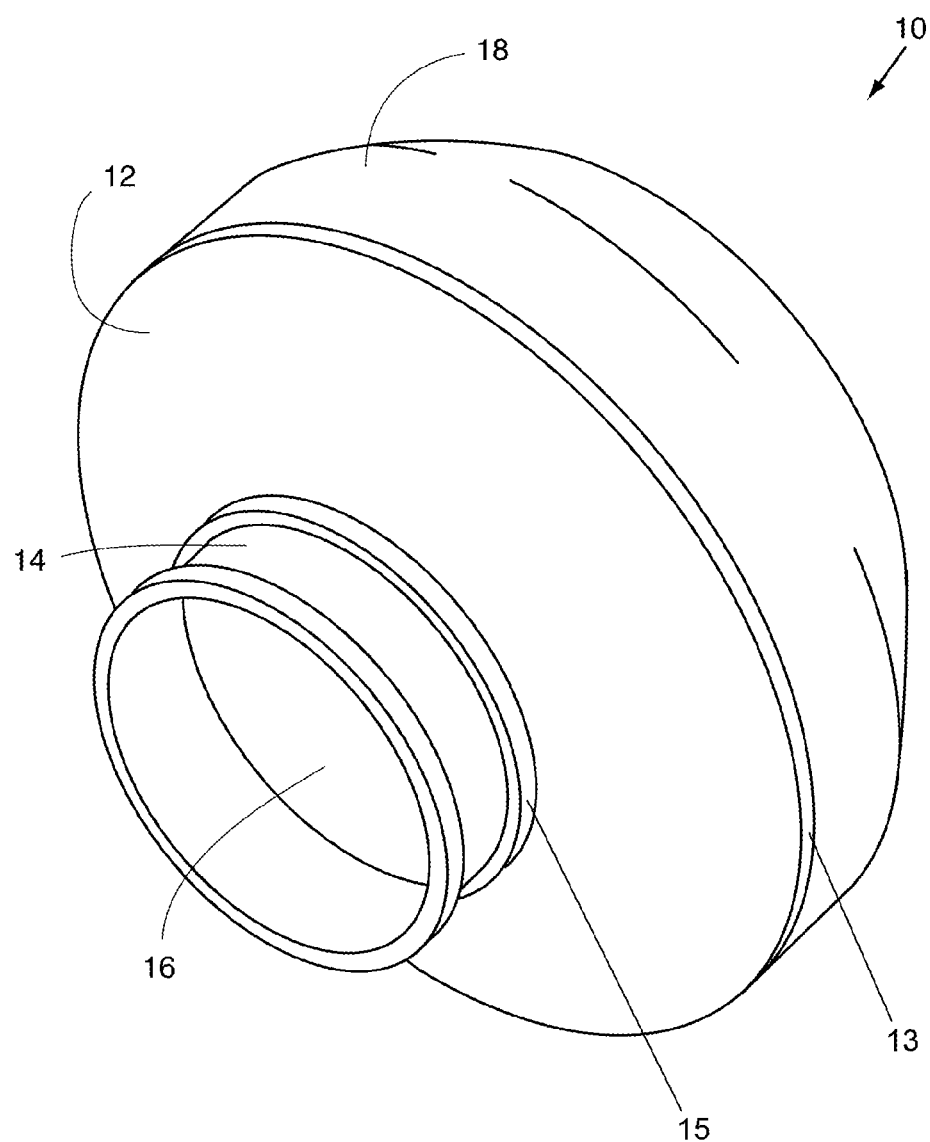
FIG. 1 is a perspective view of an embodiment of the reticulated foam for horticultural applications of the subject matter of the present invention.

Turning now to the embodiment of FIG. 1, there is shown an exemplary air filtration apparatus 10 for use in horticultural applications, in accordance with at least one embodiment. In a bit more detail, the apparatus 10 comprises a coupling portion 14 defining an opening 16 extending therethrough, a support portion 12 integral about a free end 15 of the coupling portion 14, and a reticulated foam piece 18 coupled to, and configured for covering, an opposing end 13 of the support portion 12.

Figure 2:
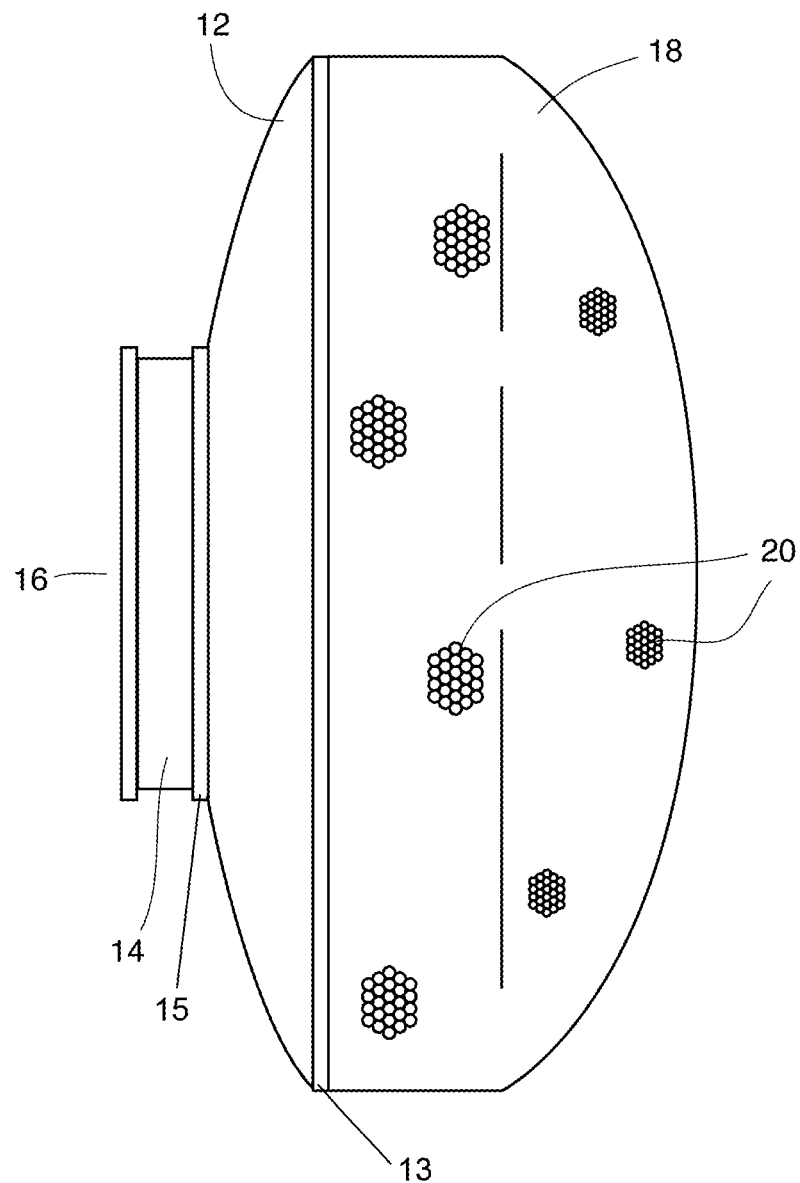
FIG. 2 is a side view of an embodiment of the reticulated foam for horticultural applications of the subject matter of the present invention.

As clearly shown in FIG. 2, the reticulated foam piece 18 can be coupled to the support piece 12 to ensure, among other things, durability and proper positioning of the reticulated foam piece 18. However, in at least one embodiment, the reticulated foam piece 18 is removably engagable with the support portion 12. In addition, while the coupling portion 14 is substantially cylindrical in shape in the exemplary embodiment, in further embodiments, the coupling portion 14 can be customized in a variety of ways to fit areas where air filtration is desired. The coupling portion 14 can be made of a variety of materials, including relatively rigid materials such as rubber and/or plastic.

Figure 3:
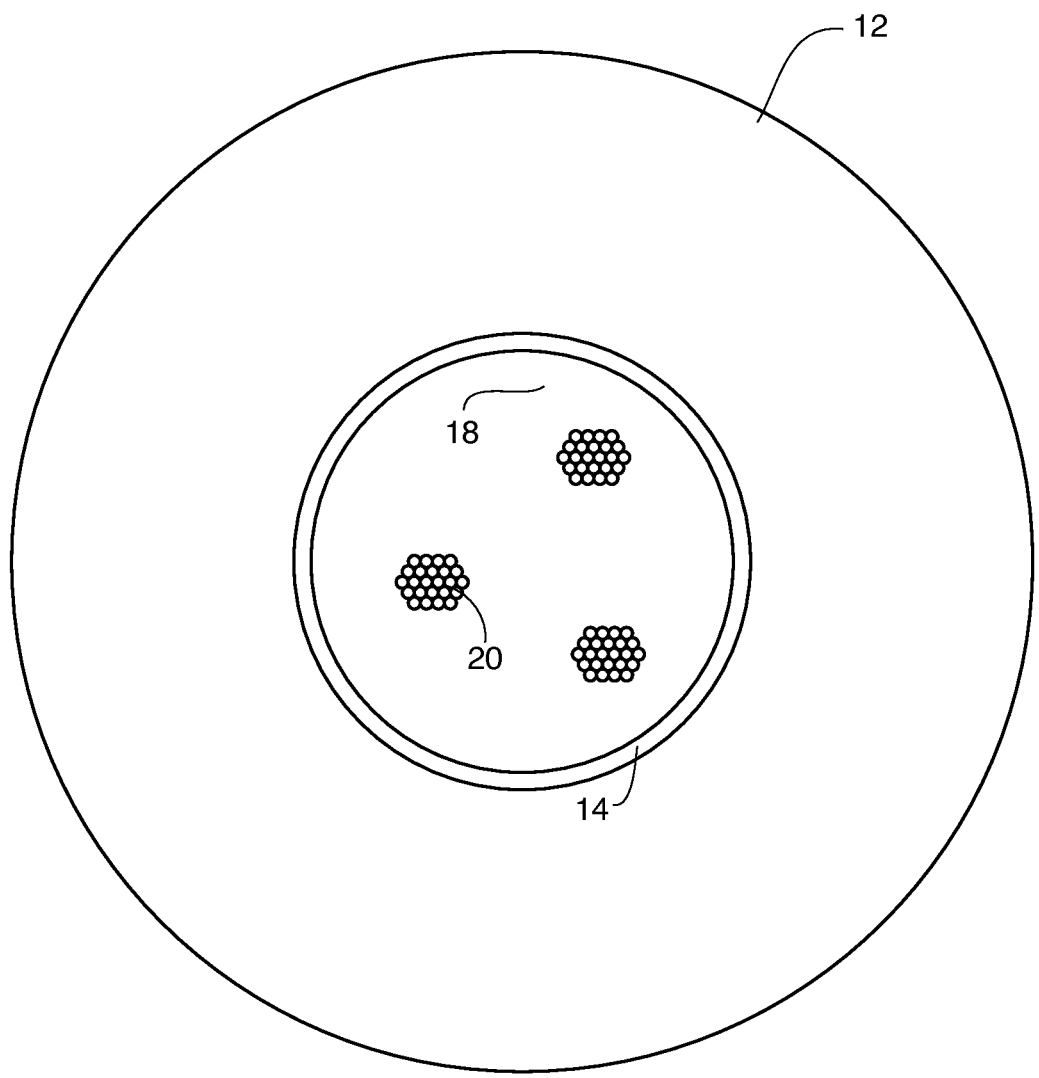
FIG. 3 is a bottom view of the reticulated foam for horticultural applications of the present invention.

In FIG. 3, the opening 16 to the coupling portion 14 is clearly visible. It should be noted that, while the support portion 12 is flared or of a substantially frusto-conical shape—with the opposing end 13 of the support portion 12 having a diameter relatively larger than that of the coupling portion 14—in the exemplary embodiment, in further embodiments, the support portion 12 can be also made in a variety of shapes and sizes depending on the situation and the degree of air filtration necessary. Additionally, similar to the coupling portion 14, the support portion 12 can be made of a variety of materials, including relatively rigid materials such as rubber and/or plastic.

Figure 4:
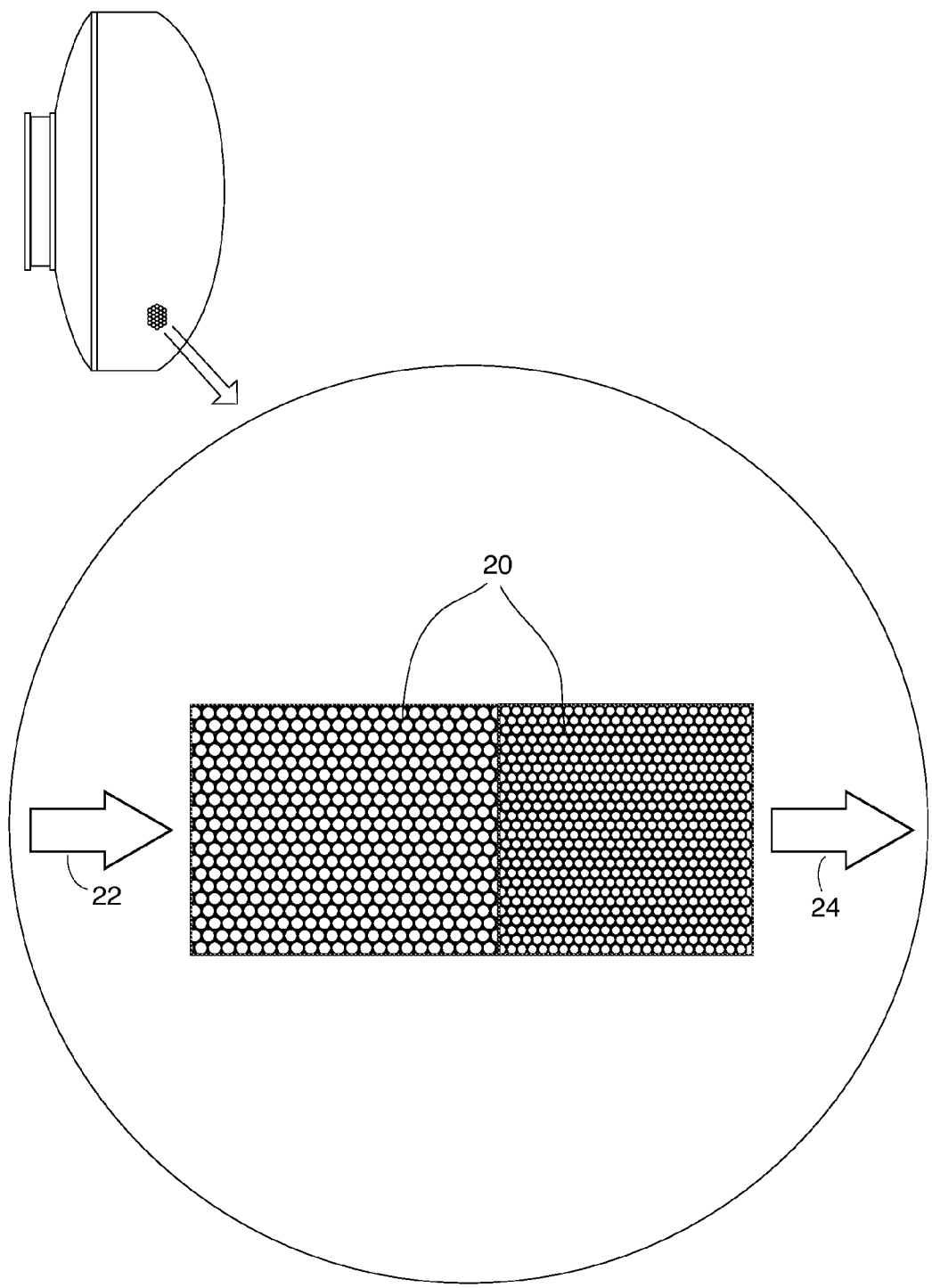
FIG. 4 is a close up view of the reticulated foam for horticultural applications of the present invention depicting a point of air exchange.

As seen in FIG. 4, an exploded view of the reticulated foam piece 18 can be seen showing normal un-filtered air 22 flowing through the reticulated foam 20 and then becoming filtered air 24. The reticulated foam 20 can come in different foam densities to improve air filtration by trapping or filtering out certain air impurities that are undesirable for horticultural applications. Additionally, while the reticulated foam piece 18 is substantially dome-shaped in the exemplary embodiment, in further embodiments, the reticulated foam piece 18 can be made in a variety of shapes and sizes depending on the situation and the degree of air filtration necessary. In one embodiment, oil can be applied directly on the reticulated foam 20 to enhance the filtration ability. Another feature of the reticulated foam piece 18 is that it is able to be cleaned by washing it without negatively affecting the filtration aspects of the reticulated foam 20.

Figure 5:
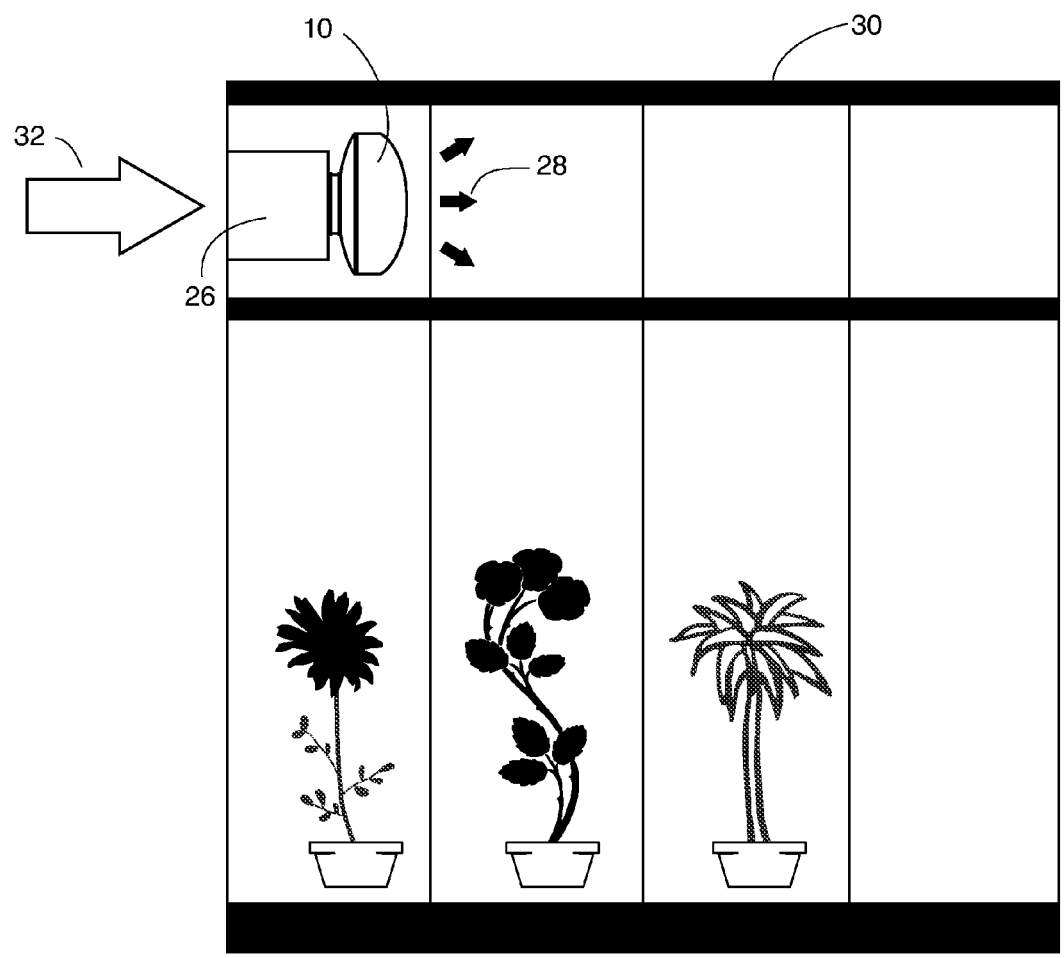
FIG. 5 is a drawing showing one example of an embodiment of the reticulated foam for horticultural applications of the present invention being used in an indoor garden room/greenhouse application.

Turning to FIG. 5, in one embodiment, the apparatus 10 can be seen in use in an indoor greenhouse 30. As seen, the coupling portion 14 of the reticulated foam for horticultural applications is engagable about an un-filtered air source 26 where outside un-filtered air 32 is allowed into the indoor greenhouse 30.

In typical use, the user would install the apparatus 10 in an indoor growing room or greenhouse 30 in the area where there is an opening to allow in outside un-filtered air or in any locations within the growing room or greenhouse that air filtration is desired. The coupling portion 14 of the apparatus 10 can be customized to fit any air entrance opening. Thus apparatus 10 can manufactured in a variety of sizes and shapes dependent on the need. In one embodiment, once the apparatus 10 is installed, the outside un-filtered air 32 will flow through the opening 16 and through the reticulated foam 20 where air impurities that are undesired for horticultural applications are filtered out and exchanged for filtered air 28.

Thus, specific embodiments and applications of the reticulated foam for use in horticultural applications have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. An air filtration apparatus for use in horticultural applications, the apparatus comprising:
    a cylindrical coupling portion is engaged about an un-filtered air source in fluid communication with an enclosed plant growing area, the coupling portion defining an opening extending therethrough;
    a frusto-conical support portion integral about a free end of the coupling portion; and
    a reticulated foam piece engagable with, and configured for covering, an opposing end of the support portion;
    whereby, with the coupling portion engaged about the un-filtered air source, the apparatus is capable of removing or trapping impurities as the un-filtered air travels into the opening of the coupling portion and through the reticulated foam piece.

2. The air filtration apparatus of claim 1, wherein the apparatus is of unitary construction.

3. The air filtration apparatus of claim 1, wherein the reticulated foam piece is substantially dome-shaped.

4. The air filtration apparatus of claim 1, wherein the coupling portion is composed of relatively rigid materials.

5. The air filtration apparatus of claim 1, wherein the support portion is composed of relatively rigid materials.

6. The air filtration apparatus of claim 1, wherein the reticulated foam piece is removably engagable with the opposing end of the support portion.

7. The air filtration apparatus of claim 6, wherein the reticulated foam piece is washable and reusable.

8. The air filtration apparatus of claim 1, wherein a diameter of the opposing end of the support portion is relatively larger than a diameter of the coupling portion.

9. The air filtration apparatus of claim 1, wherein the coupling portion is engageable about an un-filtered air source in fluid communication with an air cooled lamp reflector positioned within an enclosed plant growing area.

10. An air filtration apparatus for use in horticultural applications, the apparatus comprising:

a cylindrical un-filtered air source is in fluid communication with an enclosed plant growing area, the coupling portion defining an opening extending therethrough;

a frusto-conical support portion integral about a free end of the coupling portion; and a dome-shaped reticulated foam piece engagable with, and configured for covering, an opposing end of the support portion;

whereby, with the coupling portion engaged about the un-filtered air source, the apparatus is capable of removing or trapping impurities as the un-filtered air travels into the opening of the coupling portion and through the reticulated foam piece.

11. An air filtration apparatus for use in horticultural applications, the apparatus comprising:

a cylindrical coupling portion is engaged about an un-filtered air source in fluid communication with an air cooled lamp reflector positioned within an enclosed plant growing area, the coupling portion defining an opening extending therethrough;

a frusto-conical support portion integral about a free end of the coupling portion; and a reticulated foam piece engagable with, and configured for covering, an opposing end of the support portion;

whereby, with the coupling portion engaged about the un-filtered air source, the apparatus is capable of removing or trapping impurities as the un-filtered air travels into the opening of the coupling portion and through the reticulated foam piece.

* * * * *